United States Patent [19]

Jackson

[11] 4,197,390

[45] Apr. 8, 1980

[54] THICKENABLE THERMOSETTING VINYL ESTER RESINS

[75] Inventor: Roy J. Jackson, Houston, Tex.

[73] Assignee: Shell Oil Company, Houston, Tex.

[21] Appl. No.: 13,935

[22] Filed: Feb. 22, 1979

[51] Int. Cl.² .............................................. C08L 63/00
[52] U.S. Cl. .................... 528/115; 525/404; 528/365
[58] Field of Search .......... 260/836, 837 R; 528/115, 365

[56] References Cited

U.S. PATENT DOCUMENTS

| | | | |
|---|---|---|---|
| 3,466,259 | 9/1969 | Jernigan | 260/37 |
| 3,548,030 | 12/1970 | Jernigan | 260/836 |
| 3,963,798 | 6/1976 | Miller | 260/837 R |
| 4,141,865 | 2/1979 | Bogan | 260/18 EP |

*Primary Examiner*—Earl A. Nielsen
*Attorney, Agent, or Firm*—Norris E. Faringer

[57] ABSTRACT

Chemically modified thickenable vinyl esters prepared by reacting an ethylenically unsaturated monocarboxylic acid with a polyepoxide in the presence of a small amount of a dicarboxylic acid. These resins are usually diluted with a copolymerizable monomer such as styrene, blended with a Group II metal oxide or hydroxide and other additives, and cured with a free-radical catalyst.

11 Claims, No Drawings

THICKENABLE THERMOSETTING VINYL ESTER RESINS

BACKGROUND OF THE INVENTION

It is known to thicken vinyl ester resin compositions by the admixture of (1) a metal oxide or hydroxide, such as magnesium or calcium oxide or hydroxide, and (2) water to the vinyl ester resins containing reactive carboxyl acid groups. See, for example, U.S. Pat. Nos. 3,466,259 and 3,548,030. As noted in these two patents, among others, it is necessary to first prepare vinyl esters by reacting an ethylenically unsaturated monocarboxylic acid with a polyepoxide and then post-reacting the resulting ester with a cyclic dicarboxylic acid anhydride. The resulting modified vinyl ester is then thickened by the admixture of Group II metal oxides or hydroxides and water.

A simplified method for preparing thickenable vinyl ester resin compositions has now been found which does not require a two-step process for the vinyl ester compositions, does not require the use of a dicarboxylic acid anhydride and does not require the presence of water.

SUMMARY OF THE INVENTION

This invention relates to a chemically modified vinyl ester resin derived from polyepoxides and ethylenically unsaturated monocarboxylic acids. More particularly, the present invention provides a vinyl ester resin composition prepared by a simplified process which can be rapidly thickened by adding a Group II metal oxide or hydroxide. These thickenable compositions have excellent shelf lives yet can be cured by the addition of free radical catalysts under heat and/or pressure to produce a variety of reinforced resinous articles.

DESCRIPTION OF THE PREFERRED EMBODIMENTS

The chemically modified thickenable vinyl ester resins of the present invention are prepared by reacting an ethylenically unsaturated monocarboxylic acid with a polyepoxide in the presence of a small amount of a dicarboxylic acid, preferably in the presence of an esterification catalyst. These resins are then usually diluted with a copolymerizable monomer such as styrene and blended with the Group II oxide or hydroxide together with fillers and other additives and then cured with free-radical catalysts.

POLYEPOXIDES

The polyepoxides used to prepare the instant compositions comprise those compounds possessing at least one vicinal epoxy group, i.e., at least one

—C—————C— group. These polyepoxides may be saturated or unsaturated, aliphatic, cycloaliphatic, aromatic or heterocyclic and may be substituted, if desired, with non-interfering substituents such as halogen atoms, hydroxy groups, ether radicals, and the like. They may be monomeric or polymeric.

Various example of polyepoxides that may be used to prepare the instant esters are given in U.S. Pat. No. 2,633,458 and it is to be understood that so much of the disclosure of that patent relative to examples of polyepoxides is incorporated by reference into this specification. Generally preferred are the glycidyl polyethers of polyhyric phenols such as 2,2 -bis(4-hydroxyphenyl)-propane, including the hydrogenated polyethers thereof and polyethers prepared from hydrogenated polyhydric phenols.

Suitable such saturated epoxy compounds include those compounds derived from polyhydric phenols and having at least one vicinal epoxy group wherein the carbon-to-carbon bonds within the six-membered ring are saturated. Such epoxy resins may be obtained by at east two well-known techniques, i.e., (1) by the hydrogenation of glycidyl polyethers of polyhydric phenols or (2) by the reaction of hydrogenated polyhydric phenols with epichloronhydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol) propane.

In any event, the term "saturated epoxy resin," as used herein shall be deemed to mean the glycidyl ethers of polyhydric phenols wherein the aromatic ring stucture of the phenols have been or are saturated.

An idealized structural formula representing the preferred saturated epoxy compounds is as follows:

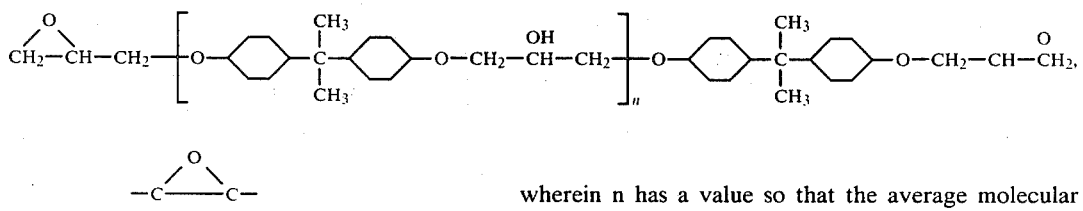

wherein n has a value so that the average molecular weight of the saturated polyepoxide is from about 350 to 3000.

Preferred saturated epoxy resins are the hydrogenated resins prepared by the process described in U.S.

Pat. No. 3,336,241. More preferred are the hydrogenated glycidyl ethers of 2,2-bis(4-hydroxyphenyl) propane, sometimes called the diglycidyl ethers of 2,2-bis(4-cyclohexanol) propane.

Other examples include the glycidyl ethers of novolac resins, i.e., phenol-aldehyde condensates. Preferred resins of this type and their preparation are illustrated in U.S. Pat. Nos. 2,216,099 and U.S. 2,658,885.

Still other examples of polyepoxides are described in U.S. Pat. No. 3,377,406.

MONOCARBOXYLIC ACIDS

The ethylenically unsaturated carboxylic acids include the unsaturated monocarboxylic acids such as acrylic acid, methacrylic acid, crotonic acid, cinnamic acid and the like. Preferred monocarboxylic acids are acrylic acid and methacrylic acid.

DICARBOXYLIC ACIDS

Suitable dicarboxylic acids, which can be either saturated or unsaturated, include phthalic acids, chlorendic acid, tetrabromophthalic acid, adipic acid, succinic acid, glutaric acid, maleic acid, fumaric acid, citaconic acid, itaconic acid, halogenated maleic or fumaric acid, mesaconic acid and the like. Of course, mixtures of acids may be used. Preferred dicarboxylic acids are maleic acid and phthalic acid.

ESTERIFICATION CATALYSTS

Although an esterification catalyst is not required, such a catalyst is usually employed and any known esterification catalyst can be utilized to make the instant composition.

Very suitable catalysts include the metal hydroxides such as sodium hydroxide; tin salts such as stannous octoate; phosphines such as triphenyl phosphine; the onium salts such as the phosphonium salts, including the phosphonium and ammonium halides.

Preferred catalysts to be utilized in the process comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldialpylphosphonium iodide, benzyltrimethylammonium thiocyanate, and the like, and mixtures thereof.

Preferred onium salts to be employed include those of the formula:

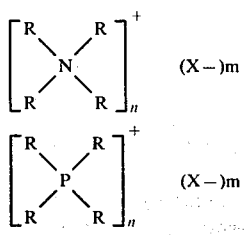

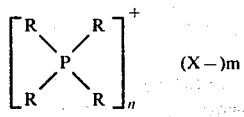

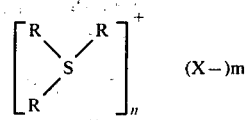

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, m is the valency of the X ion and n=m.

As noted hereinbefore, the instant vinyl ester resin compositions are simply prepared by esterifying a polyepoxide with an ethylenically unsaturated monocarboxylic acid in the presence of a small amount of a dicarboxylic acid, and, optionally in the presence of an esterification catalyst. The resulting modified vinyl ester resin is then blended with a Group II metal oxide or hydroxide, fillers, additives, compatible comonomers, and the like, and cured with a free-radical catalyst.

The amount of the polyepoxide and the ethylenically unsaturated monocarboxylic acid used in the esterification reaction will vary over a wide range. In general, these reactants are used in approximately chemical equivalent amounts. As used herein and in the appended claims, a chemical equivalent amount of the polyepoxide refers to that amount needed to furnish one epoxy group per carboxyl group. Under some circumstances, excess amounts of either reactant can be used. Preferred amounts range from about 0.5 to 2.1 equivalents of epoxide per equivalent of monocarboxylic acid.

The amount of dicarboxylic acid will vary widely depending upon the thickening schedule desired and the amounts of Group II oxides or hydroxides utilized or tolerable in the system. In general, the amount of dicarboxylic acid will vary from about 0.01 to about 0.75 chemical equivalents per chemical equivalent of polyepoxide and more preferably from about 0.02 to 0.25 chemical equivalents. It will be appreciated that the amount of monocarboxylic acid employed will be adjusted depending upon the amount of dicarboxylic acid used.

Expressed another way, the total amount of carboxylic acid components will preferably range from about 0.5 to 2.0 chemical equivalents of epoxide per chemical equivalent of carboxylic acids. More preferably the amounts of epoxide and carboxylic acids will be approximately stoichiometric amounts, i.e., from about 0.8 to 1.2 chemical equivalents of polyepoxide per chemical equivalents of carboxylic acids. The equivalent ratio of monocarboxylic acid to dicarboxylic acid will then generally range from about 0.99:0.01 to 0.25:0.75 and preferably from about 0.98:0.02 to about 0.75 to 0.25.

The amount of the catalyst employed may also vary over a considerable range. In general, the amount of the catalyst will vary from about 0.5% to about 3% by weight, and more preferably from 0.1% to 2% by weight of the reactants. The reaction may be conducted in the presence or absence of solvents or diluents. In most cases, the reactants will be liquid and the reaction may be easily effected without the addition of solvents or diluents. However, in some cases, where either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for sometime after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The polyester products (vinyl esters) obtained by the above process will vary from liquids to solid resins and will possess a plurality of ethylenic groups. The products will be of higher molecular weight than the basic polyepoxide from which they are formed and will possess at least two acid groups per polyepoxide unit.

The new polyesters will be compatible and soluble in a great variety of different materials. They will be compatible, for example, with various oils, tars, resins and the like, and with a great variety of different types of unsaturated monomers. Examples of such monomers include, among others, aromatic compounds such as styrene, alpha-methylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acid, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, and the like, and mixtures thereof.

The new hydroxy-substituted polyesters may be polymerized alone in combination with any of the above-noted unsaturated monomers to form valuable polymeric products. When used in combination with the above components, the amount of the other component may vary over a wide range, but it is generally preferred to have at least 15% by weight of the polyester present. In working with components, such as the aromatic unsaturated monomers, such as styrene, it is preferred to utilize from 1% to about 70% of the dissimilar monomer and from 99% to 30% of the present polymer.

According to the present invention, the highly desirable property of controlled thickening is obtained when preselected amounts of finely divided Group II metal oxides and/or hydroxides are added to the instant modified vinyl esters, preferably admixed with a copolymerizable monomer containing a $>C=CH_2$ group, such as styrene. The admixture of the Group II metal oxide or hydroxide produces rapid, controlled thickening without the addition of water.

The proportions of the Group II metal oxide and/or hydroxide required to achieve the desired degree of thickening will vary from about 0.1 phr to about 15 phr based on the total weight of resins (polymers and monomers) present. A preferred range is from 1 phr to about 5 phr.

The thickening action is a function of a number of variables; namely, (1) amount of dicarboxylic acid employed in the preparation of the polyesters, (2) the amount and particular Group II metal oxide and/or hydroxide employed, and (3) the temperature employed. As the temperature is increased above normal room temperature, the rate of thickening becomes more rapid until a temperature of about 80° C., then the thickening tends to approach a constant value. While thickening can be made to occur at room temperature, the preferred temperature range is from 20° C. to 75° C.

The polymerization of the above-noted polyesters or mixtures of monomers may be accomplished by any suitable method. The preferred method comprises heating the monomer or mixture of monomers in the presence of a free radical yielding catalyst. Examples of such catalysts includes the peroxides, such as benzoyl peroxide, potassium persulfate, methyl cyclohexyl peroxide, cumene hydroperoxide, acetyl benzoyl peroxide, Tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobiisobutyrate, 2,2'-azobis(2,4-dimethylvaleronitrile, 2,2'-azobiisotulyamide, and the like. Particularly preferred catalysts include the diaroyl peroxide, tertiary alkyl hydroperoxides, alkyl peresters of percarboxylic acids and particularly those of the above-noted groups which contain no more than 18 carbon atoms per molecule and have a decomposition temperature below 125° C.

Other materials may also be added to the mixtures before or during polymerization. These include plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalyst selected. In general, polymerization temperatures may vary from about 20° C. to about 200° C. and more preferably from 20° C. to 165° C.

The unsaturated polyesters and their above-noted mixtures with other monomers may be utilized in a wide variety of different applications. They may be utilized in the preparation of coatings and impregnating compositions, in the preparation of adhesives for metals, wood, cement and the like, and in the preparation of reinforced composite products, such as laminated products, filament windings and the like. In this latter application, the polyester compositions are applied to the fibrous products, such as glass fibers or sheets, the material formed into the desired object and heated to effect cure of the polyester composition.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight. The viscosity measurements were measured on a Brookfield viscometer at room temperature. In the examples, the initial viscosity measurements are taken before the addition of the Group II metal oxide or hydroxide.

EXAMPLE I

This example illustrates the viscosity improvement exhibited by the instant polyester composition over the conventionally prepared polyesters. Into a 3-liter flask equipped with stirrer, thermometer, $N_2$ sparge tube and condenser were placed the following composition:

| Composition | Parts by Weight |
| --- | --- |
| Epoxy Resin A [glycidyl polyether of 2,2-bis(4-hydroxyphenyl)propane having average molecular weight of about 350 and an equivalent weight of about 170–190] | 795 |
| 2,2-bis(4-hydroxyphenyl)propane (BPA) | 237 |
| Tetramethylammonium chloride (TMAC) | 0.825 |

This mixture was then heated for one hour at 171° C. (340° F.). Then the following composition was added and the combined mixture heated for three hours at 115° C. (240° F.) and an $N_2$/air sparge.

| Composition | Parts by Weight |
| --- | --- |
| Glacial methacrylic acid | 195.2 |
| Hydroquinone | 0.45 |
| TMAC | 6.6 |

After cooling, 970 parts by weight of styrene were added to the above vinyl ester and the mixture thoroughly mixed. The 2 parts of MgO per 100 parts by weight of the total resin mixture were added and thoroughly mixed. The viscosity at various time intervals was then determined.

This composition containing no dicarboxylic acid, hereinafter designated as Vinyl Ester A, exhibited an initial viscosity of about 500 cp. No significant increase in viscosity was observed after 7 days.

The above procedure was essentially repeated wherein a portion of the monocarboxylic acid (methacrylic acid) was replaced with a dicarboxylic acid (maleic acid). The composition was as follows:

| Composition | Parts by Weight |
| --- | --- |
| Epoxy Resin A | 795 |
| BPA | 237 |
| TMAC | 0.825 |
| Glacial methacrylic acid | 171.3 |
| Maleic acid | 32.25 |
| TMAC | 6.6 |
| Styrene | 970.0 |
| MgO | 2 phr |

The final composition containing maleic acid, herein designated Vinyl Ester B exhibited the following viscosity:

| Time | Viscosity, cps |
| --- | --- |
| Initial | 1230 |
| 24 hours | 85,000 |
| 48 hours | $2.150 \times 10^{106}$ |
| 7 days | $4.0 \times 10^6$ |

EXAMPLE II

The procedure of Example I was essentially repeated using the following compositions:

| | Parts by Weight | |
| --- | --- | --- |
| Components | Vinyl Ester C | Vinyl Ester D |
| Epoxy Resin A | 1700 | 1700 |
| Phenolic Novolac having an average molecular weight of 520 and a phenolic functionality of about 5 (Phenolic Novolac A) | 135.15 | 135.15 |
| TMAC | 0.69 | 0.69 |
| Glacial methacrylic acid | 649.15 | 629.75 |
| Maleic acid | — | 30 |
| Hydroquinone | 1.35 | 1.35 |
| TMAC | 6.95 | 6.95 |
| MgO | 2 phr | 2 phr |
| Styrene | 1610 | 1610 |

The viscosity schedule was as follows:

| | Viscosity, cps | |
| --- | --- | --- |
| Time | Vinyl Ester C | Vinyl Ester D |
| Initial | 300 | 465 |
| 2 days | 950 | 315,000 |
| 4 days | 1150 | 928,000 |
| 7 days | 1325 | $1.04 \times 10^6$ |

EXAMPLE III

The procedure of Example II was essentially repeated wherein phthalic acid is used in lieu of maleic acid. The following compositions were employed:

| | Parts by Weight | |
| --- | --- | --- |
| Components | Vinyl Ester E | Vinyl Ester F |
| Epoxy Resin A | 1000 | 1000 |
| Phenolic Novolac A | 79.5 | 79.5 |
| TMAC | 0.81 | 0.81 |
| Glacial methacrylic acid | 387.3 | 378 |
| Phthalic acid | — | 17.9 |
| TMAC | 8.2 | 8.2 |
| Hydroquinone | 0.8 | 0.8 |
| MgO | 2 phr | 2 phr |
| Styrene | 954 | 954 |

The viscosity schedule was as follows:

| | Viscosity, cps | |
| --- | --- | --- |
| Time | Vinyl Ester E | Vinyl Ester F |
| Initial | 500 | 1150 |
| 1 hour | — | 12,000 |
| 2 hours | — | 172,000 |
| 1 day | — | 752,000 |
| 2 days | 950 | 752,000 |

EXAMPLE IV

The procedure of Example I was essentially repeated wherein 1 phr of MgO and 2 phr of $Ca(OH)_2$ were used. Related viscosity improvements were observed.

EXAMPLE V

Related results are obtained when the methacrylic acid is replaced with an equivalent amount of acrylic acid.

EXAMPLE VI

A glass reinforced sheet was prepared from the following composition:

| Component | Parts by Weight |
| --- | --- |
| Vinyl Ester B (vinyl ester/styrene blend) | 100 |
| MgO | 4 |
| Lupersol 101 [2,5-dimethyl(bis-2,5-diterbutylperoxy)hexane] | 0.75 |
| Microthene | 5 |
| Calcium stearate | 4 |
| Calcium carbonate | 50 |
| ¼" chopped glass (CPPG 3303) | 70 |

The above composition, cured at 300° F. for 3 minutes, produced a hard stable laminate indicating its usefulness in SMC applications.

What is claimed is:

1. A fast curing vinyl ester resin composition comprising (A) at least 30 percent by weight of a vinyl ester resin prepared by reacting a polyepoxide with from about 0.5 to about 2.0 chemical equivalents of a carboxylic acid blend comprising (1) an ethylenically unsaturated monocarboxylic acid (2) a dicarboxylic acid, said acids being employed in the equivalent ratio of from about 0.99:0.1 to about 0.25:0.75, (B) up to 70 percent by weight of at least one ethylenically unsaturated comonomer, (C) from about 0.1 to about 15 parts by weight per one hundred parts by weight of the vinyl ester/comonomer blend of a Group II metal oxide or hydroxide, and (D) a curing amount of a free-radical curing agent.

2. The composition of claim 1 wherein the polyepoxide is a glycidyl polyether of 2,2-bis(4-hydroxyphenyl) propane.

3. The composition of claim 1 wherein the chemical equivalent ratio of polyepoxide to carboxylic acids is from about 0.8:1.0 to 1.2:1.0.

4. The composition of claim 4 wherein the ratio is from about 0.98:0.02 to about 0.75:0.25.

5. The composition of claim 1 wherein the ethylenically unsaturated monocarboxylic acid is acrylic acid.

6. The composition of claim 1 wherein the ethylenically unsaturated monocarboxylic acid is methacrylic acid.

7. The composition of claim 1 wherein the dicarboxylic acid is maleic acid.

8. The composition of claim 1 wherein the dicarboxylic acid is phthalic acid.

9. The composition of claim 1 wherein the Group II metal oxide is magnesium oxide.

10. The composition of claim 1 wherein the comonomer is styrene.

11. The composition of claim 1 wherein the free radical curing agent is an organic peroxide.

* * * * *